D. Jones.
Axle for Wagons.
N° 73340. Patented Jan. 14, 1868.
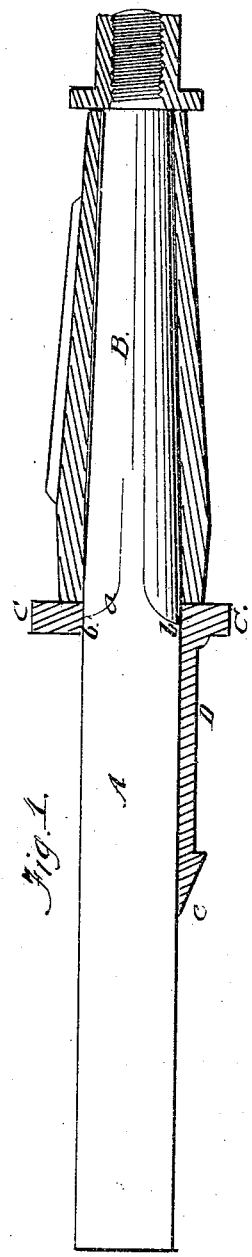
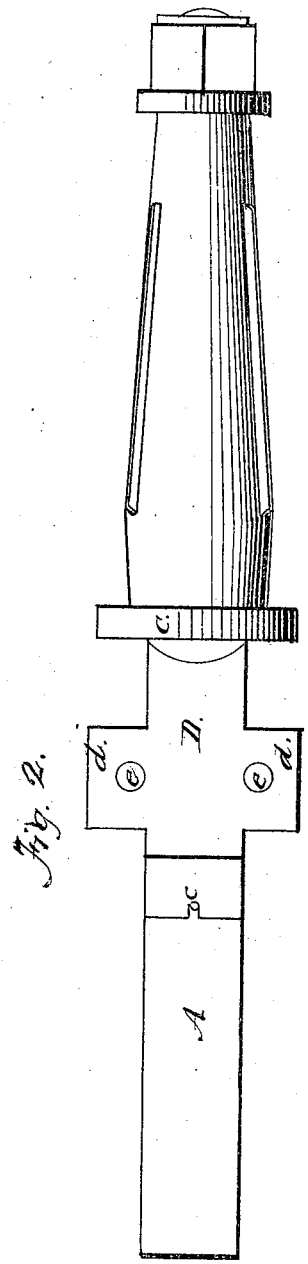
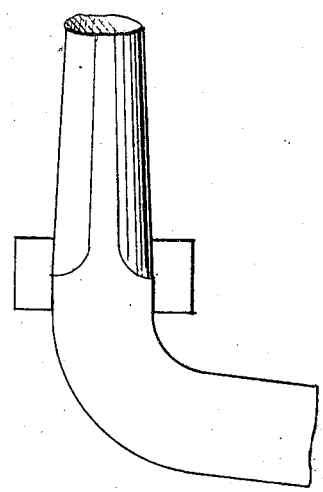
Witnesses
C. W. M. Smith
J. L. Boone
Inventor
Danus Jones

United States Patent Office.

DANIEL JONES, OF SAN FRANCISCO, CALIFORNIA.

Letters Patent No. 73,340, dated January 14, 1868.

IMPROVEMENT IN AXLE FOR WAGONS.

*The Schedule referred to in these Letters Patent and making part of the same.*

TO ALL WHOM IT MAY CONCERN:

Be it known that I, DANIEL JONES, of San Francisco, county of San Francisco, State of California, have invented an Improved Wagon-Axle; and I do hereby declare the following description and accompanying drawings are sufficient to enable any person skilled in the art or science to which it most nearly appertains to make and use my said invention or improvements without further invention or experiment.

The object of my invention is to provide an improved wagon-axle; and it relates to the employment of a countersunk collar, either with or without an arm extending along the axle, the effect of which is to strengthen the shoulder where the square portion joins the part on which the wheel turns; it also relates to a peculiar manner of forming the shoulder, by which said shoulder is materially strengthened, and rendered much less liable to break.

To more fully illustrate and explain my invention, reference is had to the accompanying drawings, forming a part of this specification, and the letters marked thereon, of which—

Figure 1 is a side sectional view of an axle with my improvements.

Figure 2 is a bottom view.

Similar letters of reference indicate like parts in each of the figures.

A is the square, and B the cylindrical portion of an axle, having a shoulder at $a$, formed by turning it in a curve, either elliptic or circular, the inside of the collar being made to fit said curve closely, at a point near its centre. The collar C may be made slightly longer than ordinary collars, and is so formed that its inner portion, $b$, fits the square part of the axle, while below the shoulder it fits the cylinder part of the axle. A strap of iron, D, is welded to or formed with the collar C, so as to extend along beneath the axle a short distance. The pin $c$, on the axle, fits into a groove in this strap, as shown, and keeps it in place. Upon each side of the strap may be formed the lugs $d\ d$, having holes $e\ e$, through which the clips pass, and by means of which the whole is firmly bound together; or, if more convenient, the lugs may be left off altogether, and the clips simply embrace the axle-bed and strap. In case of a truck, or where a bent axle is used, making it impossible to use the strap, the collar is made much longer, as shown in red, thus giving the requisite strength.

By experiment, it is found that the same axle will bear from one-fourth to one-third more weight with this improvement, for in turning ordinary axles, the shoulder is turned up perfectly square, thus leaving a sharp angle at the point where the greatest strain is brought to bear, without anything to support it, as the ordinary collar is simply shrunk on close to this shoulder. By forming the shoulder on a curve, it is much strengthened, while the countersunk collar, with the strap, as described, forms a perfect support to that part.

Having thus described my invention, what I claim as new, and desire to secure by Letters Patent, is—

The countersunk collar C, either in combination with the strap D, or, where used alone, constructed and arranged substantially as and for the purpose described.

In witness whereof, I have hereunto set my hand and seal.

DANIEL JONES. [L. S.]

Witnesses:
C. W. M. SMITH,
J. L. BOONE.